United States Patent [19]
Becker et al.

[11] 3,930,003
[45] Dec. 30, 1975

[54] COUMARINE DERIVATIVES AND PROCESS FOR THE PREPARATION THEREOF

[75] Inventors: Karl Heinz Becker, Rossdorf near Darmstadt; Karl-Heinz Boltze, Bensberg-Kippekausen; Hans-Dieter Dell, Cologne; Peter-Rudolf Seidel, Porz-Wahnheide, all of Germany

[73] Assignee: Troponwerke Dinklage & Co., Cologne, Germany

[22] Filed: Mar. 13, 1974

[21] Appl. No.: 450,925

Related U.S. Application Data

[62] Division of Ser. No. 163,110, July 15, 1971.

[30] Foreign Application Priority Data

July 17, 1970 Germany............................ 2035536
Feb. 20, 1971 Germany............................ 2108185

[52] U.S. Cl. ................ 424/248; 424/244; 424/251; 424/267; 424/283
[51] Int. Cl.² ...................................... A61K 31/535
[58] Field of Search .......................... 424/248, 283

[56] References Cited
UNITED STATES PATENTS

| | | | |
|---|---|---|---|
| 2,881,186 | 4/1959 | Hauserman .................... | 260/343.2 |
| 3,726,902 | 4/1973 | Beyerle et al.................. | 424/283 |
| R23,703 | 9/1953 | Ackermann .................... | 260/343.2 |

OTHER PUBLICATIONS
Chemical Abstracts 65:677(d).

*Primary Examiner*—Norman A. Drezin
*Attorney, Agent, or Firm*—Burgess, Dinklage & Sprung

[57] ABSTRACT

Compounds having the general formula (I)

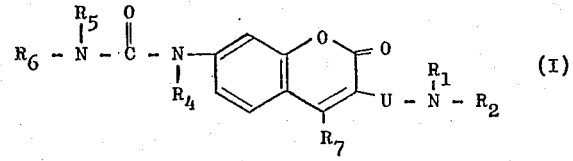

and salts thereof with physiologically acceptable acids, in which $R_1$, $R_2$, $R_5$ and $R_6$ represent hydrogen atoms, straight-chain or branched-chain alkyl groups with up to 4 carbon atoms, cycloalkyl, aralkyl, aryl groups or the radicals $R_1$ and $R_2$, and/or radicals $R_5$ and $R_6$, when taken together with the adjacent nitrogen atom represent heterocyclic compounds with 3 to 7 ring members of which 1 to 3 can be hetero atoms, providing that $R_1$, $R_2$ and $R_5$ and $R_6$ can be the same or different radicals, and also the groups —$NR_1R_2$ and —$NR_5R_6$ can be the same or different, $R_4$ represents a hydrogen atom or a lower alkyl group with up to 3 carbon atoms, $R_7$ represents a hydrogen atom, a lower alkyl group with up to 3 carbon atoms or an aryl group, Z represents a halogen atom, a lower alkyl or alkoxy group with up to 3 carbon atoms, N represents a number from 0 to 2, and U represents a straight-chain or branched-chain lower alkylene group with 2 to 5 carbon atoms in which a hydrogen atom can be replaced by a hydroxyl group. These compounds have utility as coronary dilators.

21 Claims, No Drawings

COUMARINE DERIVATIVES AND PROCESS FOR THE PREPARATION THEREOF

This is a division of application Ser. No. 163,110, filed July 15, 1971.

This invention relates to novel coumarine derivatives having utility as coronary dilators.

The invention provides coumarine derivatives effective as coronary dilators of the general formula (I)

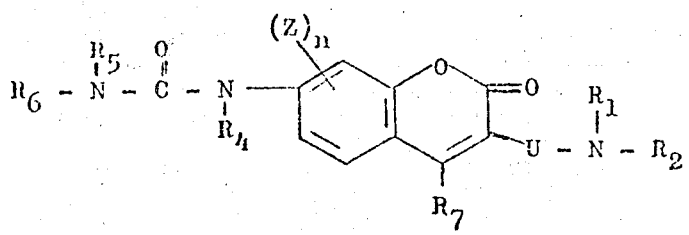

and salts thereof with physiologically acceptable acids, in which $R_1$, $R_2$, $R_5$ and $R_6$ represent hydrogen atoms, straight-chain or branched-chain alkyl groups with up to 4 carbon atoms, in which a hydrogen atom may be replaced by a hydroxyl group, cycloalkyl, aralkyl or aryl groups — advantageously with a single ring system and hence up to a maximum of 8 carbon atoms in the respective radical, which optionally can be substituted by 1 or 2 halogen atoms, lower alkyl groups (preferably $C_1$ to $C_3$), lower alkoxy groups (preferably $C_1$ to $C_3$-alkoxy), hydroxyl groups or trifluoromethyl groups, and in which the radicals $R_1$ and $R_2$ as well as $R_5$ and $R_6$, may together with the adjacent nitrogen atom, represent heterocylic compounds with 3 to 7 ring members, of which 1 to 3 can be hetero atoms, the heterocyclic compounds being if desired substituted with one or two substituents such as aryl (preferably with 1 ring system) or lower (preferably $C_1$ to $C_5$) alkyl groups or lower (preferably $C_1$ to $C_5$) alkyl groups substituted by a hydroxyl group, halogen atoms or trifluoromethyl groups, while these radicals $R_1$, $R_2$, $R_5$ and $R_6$ can be like or different radicals and in addition also the pairs $-NR_1R_2$ or $-NR_5R_6$ can be like or different, $R_4$ represents a hydrogen atom or a lower alkyl group with up to 3 carbon atoms, $R_7$ represents a hydrogen atom, a lower alkyl group with up to 3 carbon atoms or an aryl group with advantageously 1 ring system, Z represents a halogen atom or a lower alkyl or alkoxy group with up to 3 carbon atoms, N represents the numbers from 0 to 2, and U represents a straight-chain or branched-chain lower alkylene group with 2 to 5 carbon atoms in which one hydrogen atom can be replaced by a hydroxyl group.

The invention also provides a process for the preparation of compounds of the general formula I, in which $R_1$ to $R_7$, U, Z and n are as defined above, which comprises reacting together a. Compounds of the general formula (II)

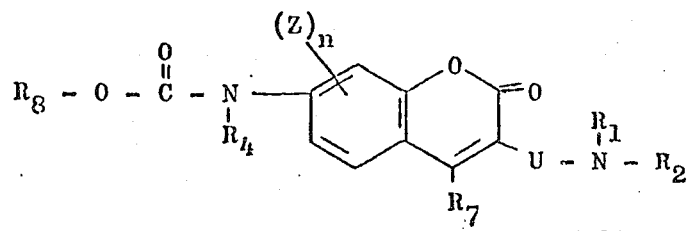

in which $R_1$, $R_2$, $R_4$, $R_7$, U, Z and n have the meanings indicated, and $R_8$ stands for an alkyl or aryl group, or compounds of the general formula (III)

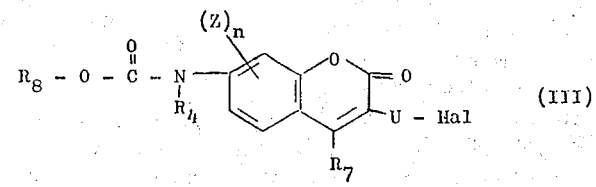

in which $R_4$, $R_7$, $R_8$, U, Z and n have the meaning indicated and Hal represents a halogen atom, or compounds of the general formula (IV)

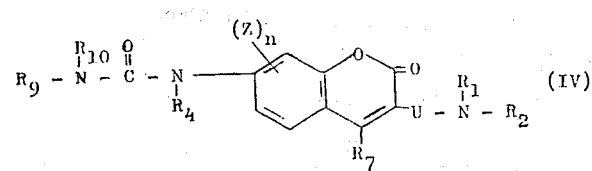

in which $R_1$, $R_2$, $R_4$, $R_7$, U, Z and n have the meaning indicated and $R_9$ and $R_{10}$ have the same meaning as $R_1$ and $R_2$ and hence can be identical with these or also different therefrom, or compounds of the general formula (V)

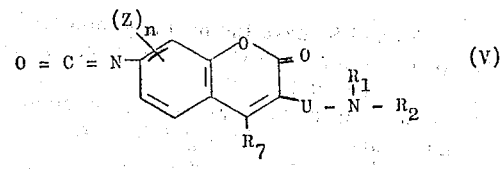

in which $R_1$, $R_2$, $R_7$, U, Z and n have the meaning indicated, or compounds of the general formula (VI)

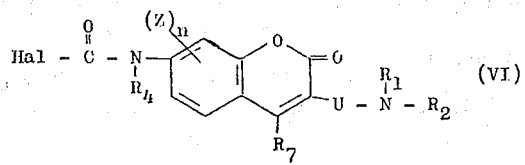

in which $R_1$, $R_2$, $R_4$, $R_7$, U, Z and $n$ have the meaning indicated and Hal stands for a halogen atom;
with compounds of the general formula (VII)

(VII)

in which $R_1$ and $R_2$, or $R_5$ and $R_6$, respectively, have the meaning indicated above, but in the case of the reaction of compounds of the general formula IV, the radical $-NR_9R_{10}$ is not identical to the radical of the secondary amine of the general formula (VII).

The compounds of the invention may also be prepared by reacting compounds of the general formula (VIII)

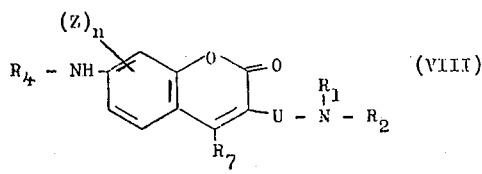
(VIII)

in which $R_1$, $R_2$, $R_4$, $R_7$, U, Z and $n$ have the meaning indicated,
with compounds of the general formula (IX)

(IX)

in which $R_5$ has the meaning indicated above,
or with compounds of the general formula (X)

(X)

in which $R_5$ and $R_6$ have the meaning indicated,
or with compounds of the general formula (XI) — followed by subsequent saponification of the initially forming =NH group —

(XI)

in which $R_5$ and $R_6$ have the meaning indicated.

The reaction of compounds of the general formula II with compounds of the general formula VII is especially suitable for the preparation of compounds of the general formula I, in which $R_1$ and $R_2$ are different from $R_5$ and $R_6$. This reaction is effected by simply heating the components in the absence of a solvent; however, it is preferred to carry out the reaction in the presence of a solvent. Polar solvents such as dimethyl formamide and dimethyl sulphoxide have proved satisfactory, but chloroform, ethylene chloride, chlorobenzene, and nitrobenzene are preferred because of their better solution properties. Inert, aromatic hydrocarbons, such as benzene and toluene, are found to be less suitable.

The reaction takes place is particularly smooth when using compounds of formula II, in which $R_8$ represents an aryl group, especially when $R_8$ is a phenyl group. In this case, the reaction can be carried out by simple stirring at room temperature and good yields are obtained.

However, if $R_8$ represents a lower alkyl group, for example an ethyl group, the reaction is preferably effected with heating advantageously at temperatures between 50 and 120°C.

For preparing compounds of the general formula I, in which $R_1$ and $R_2$ have the same meaning as $R_5$ and $R_6$, the compounds of the general formula III are preferably used as initial material. The reaction takes place by simple heating in the excess of compounds of the general formula VII, in the presence or absence of a solvent. In preparing these compounds, inert solvents in addition to those mentioned above, with the exception of dimethyl formamide, have also been found to be satisfactory.

Particular significance is attributed to the preparation of compounds of the general formula I by the re-amidation of compounds of the general formula IV. Consequently, this reaction is particularly preferred. A basis for this process is the discovery that in the compounds of formula I, the group $-NR_5R_6$, and thus the group $-NR_9R_{10}$ in the compounds of formula IV, are exchangeable, but the group $-NR_1R_2$ is not exchangeable, under the same conditions. The group $-NR_9R_{10}$ in the compounds of formula IV can hence be transformed by a simple re-amidation with the amines of formula VII into the required group. The re-amidation leads to almost quantitative yields, if the amine of formula VII which is to be used is less volatile than the amine $HNR_9R_{10}$ to be split off. In this case, the latter can be constantly removed by distillation from the reaction mixture and the reaction can be conducted until the exchange is complete. However, the reaction equilibrium can be displaced to the required side simply with an excess of the amine of formula VII. This is particularly simple, for example, when the amine VII can be used as liquid solvent for IV.

For preparing compounds of the general formula I, in which $R_4$ represents an alkyl group, the processes so far fully explained are less suitable for use, since the reactions proceed less readily and require more forcing conditions, which lead to side products and thus to a reduction in the yield. In these cases, it it preferred to use the compounds of the general formulae VI and VIII as initial products, the compounds of the formula VI merely representing the reaction products of compounds of formula VIII with phosgene, which advantageously is not isolated, but is immediately reacted with compounds of the formula VII.

One particularly interesting and accordingly important compound of the invention is the new pharmacologically active compound N-[3-(2-morpholinoethyl)-4-methyl-2-oxo-2H-1-benzopyran-7-yl]-4-morpholine carboxamide

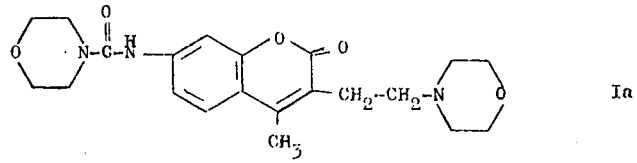
Ia as well as the salts thereof formed with physiologically compatible acids.

The compound Ia has a strong coronary-dilating efficiency, such as shown by tests on the basis of pharmacological test specimens. With intravenous application of 1 mg/kg of body weight to the narcotised dog, the coronary flow is increased by 2 to 5 times, the effect lasting more than one hour. At the same time, the "arteriovenous oxygen difference" (AVD) as a typical sign of an increased supply of oxygen to the heart muscle is correspondingly reduced. By contrast with the chemically related compound α-[3-(2-diethylaminoethyl)-4-methyl-2-oxo-2H-1-benzopyran-7-yl]oxyeacetic acid ethyl ester, (I.N.N. = carbocromene; referred to hereinafter as CBC), which has been used therapeutically as a coronary dilators in human medicine for years, Ia leads to a strong and longlasting improvement in the coronary blood flow and to a reduction of the AVD, by both intravenous or enteral application. Whereas doses of 20 mg/kg of body weight with enteral administration of CBC to the narcotised dog remained without any effect on the coronary flow (see also D. LORENZ and H.D. DELL, Tenth Spring Conference of the German Pharmacological Association from the 16th to 19th March 1969, special print from Naunyn-Schmiedebergs Archiv fur Pharmakologie, 264 (1969), Issue No. 3, pages 272–273, and also D. LENKE in Arzneimittelforschung 20 (1970), page 655), Ia resulted in a strong increase in the coronary blood flow in a dose range from 10 to 20 mg/kg on the same test animal and with the same method of administration, this increase corresponding in its degree to that according to intravenous administration, but also lasting substantially longer.

The described effect of Ia on the coronary flow from enteral application is due to the fact that Ia is resorbed from the intestinal tract and shows a substantially greater stability in the organism as compared with CBC. Whereas after enteral administration of CBC in doses of 20 mg/kg, small quantities of unchanged CBC could be detected in the blood of the test animals only a few minutes after the application (amounts of 0.002 – 0.04 γ per 5 ml of blood were found), with doses applied orally to the non-narcotised dog of 20 mg/kg of Ia, amounts of 13.7 – 69 γ per 5 ml of blood of unchanged Ia have been detected 30 minutes after application, and even after 4 hours, it was still possible to detect half of the concentration found after 30 minutes. From the comparison of the concentration of Ia in the blood after intravenous and oral application, there is obtained a resorbtion quota of 30 – 50 percent of the orally administered Ia.

The substantially greater stability of Ia in biological medium as compared to CBC was proved with in vitro tests by incubation of Ia and CBC at 37°C. in full blood and in liver homogenate. Whereas with CBC 97 to 100 percent of the quantity used were degraded after 10 minutes, the total quantity of Ia could be detected without change after incubation lasting up to 8 hours. The rapid degradation of CBC is due to the enzymatic cleavage by esterases, as already described by M. KLARWEIN and R. E. NITZ in Arzneimittelforschung 15, page 555 (1965). Ia is stable with respect to this enzyme group because of the different type of side chain on the carbon atom 7 of the coumarine ring. Ia also appears to be quite stable in relation to other enzyme systems, as shown by renal clearance tests on the animal. Up to 50 percent of the applied quantity of Ia were renally cleared as unmodified Ia within 3 days.

The invention is also concerned with a process for preparing N-[3-(2-morpholinoethyl)-4-methyl-2-oxo-2H-1-benzopyran-7-yl]-4-morpholine carboxamide (Ia) and its salts formed with physiologically acceptable acids, which comprises reacting compounds of the general formula

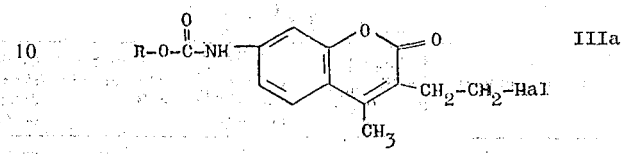

IIIa in which R represents a lower alkyl radical, preferably with up to 5 carbon atoms, or an aryl or aralkyl radical, preferably with up to 10 carbon atoms, and Hal represents a halogen atom, preferably F, Cl, Br in which Cl is particularly preferred, with morpholine and thus forming compound Ia which may be converted with a physiologically acceptable acid into its salt.

The initial compounds of the general formula IIIa are preferably prepared by condensation, for example, in hydrochloric acid medium, of compounds of the general formula

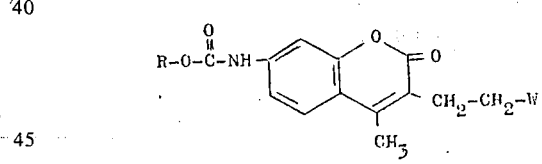

in which R has the meaning indicated above, with 3-acetyl-2-oxotetrahydrofuran. In this case, compounds of the general formula

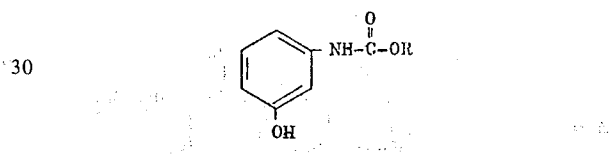

are initially formed, in which R has the meaning indicated and W represents a halogen atom or a hydroxy group, which are subsequently halogenated by the corresponding halogenation agents.

The compounds of the general formula I when applied intravenously in a dosage of 1-2 mg/kg of body weight to the narcotised dog, show a strong coronary-dilating efficiency, as can be seen from Table 2.

Table 2 shows the following data:

Column 1: The structures of the compounds being investigated;
Column 2: The quantities of substance administered in mg/kg of body weight;
Column 3: The change in the arterial blood pressure in the left ventricle (if there are two symbols, the first represents the change in the systolic blood pressure and the second the change in the diastolic blood pressure);
Column 4: The change in the blood flow from the coronary sinus;

Column 5: The change in the oxygen saturation of the coronary sinus blood;
Column 6: The change in the heart frequency.

The meaning of the symbols used in Table 2 is explained in Table 1:

TABLE I

| Increase/decrease | | Column 3 Blood pressure in mm.Hg | Column 4 Blood flow coronary sinus in % | Column 5 O2-satur. in % | Column 6 Heart frequency beats/min. |
|---|---|---|---|---|---|
| φ | φ | up to 10 | up to 10 | up to 10 | up to 10 |
| (+) | (−) | up to 20 | up to 20 | up to 20 | up to 20 |
| + | − | up to 50 | up to 50 | up to 30 | up to 50 |
| ++ | −− | up to 100 | up to 100 | up to 50 | up to 80 |
| +++ | −−− | above 100 | above 100 | above 50 | above 80 |

As regards the structures of the investigated compounds in column 1 of Table 2, the notations A, B, C and D are used to represent the basic compounds which have the following meaning:

A = 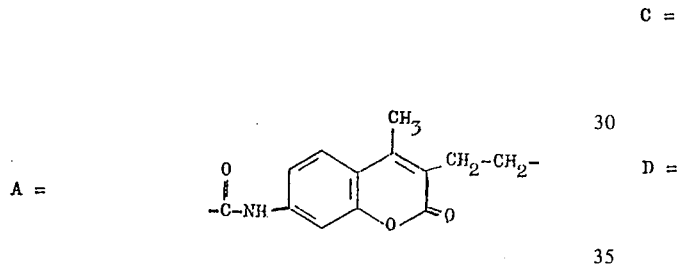

B = 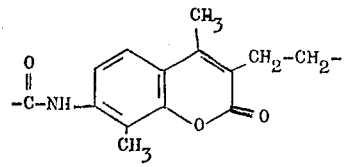

C =

D = 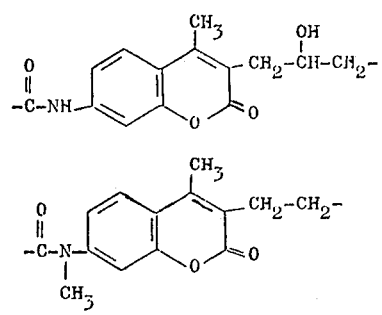

Table 2

| 1 | 2 | 3 | 4 | 5 | 6 |
|---|---|---|---|---|---|
| CH₃—CH₂\N— A —N⌒O / CH₃—CH₂ | 2 | − | +++ | +++ | ++ |
| HO(CH₂)₂—N⌒N— A —N⌒O | 2 | − | +++ | +++ | (−) |
| HO—(CH₂)₂\N— A —N⌒O / HO—(CH₂)₂ | 2 | (−)/− | +++ | +++ | (−) |
| CH₃—N⌒N— A —N⌒N—CH₃ | 2 | (−) | +++ | +++ | φ |
| ⌒N— A —N⌒ | 2 | φ | +++ | +++ | (−) |
| ⌬—NH— A —N⌒O | 2 | φ/(−) | +++ | +++ | φ |
| (CH₃)₂CH\N— A —N⌒O / (CH₃)₂CH | 2 | (−)/φ | +++ | +++ | φ |

Table 2-continued

| 1 | 2 | 3 | 4 | 5 | 6 |
|---|---|---|---|---|---|
|  | 2 | φ | +++ | (+) | ++ |
| 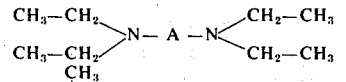 | 2 | φ | +++ | +++ | ++ |
| 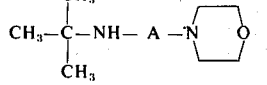 | 2 | (+)/φ | +++ | ++ | + |
| 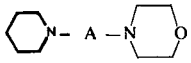 | 2 | φ | +++ | +++ | + |
|  | 2 | – | +++ | +++ | (–) |
| 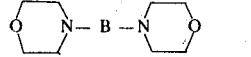 | 5 | φ | +++ | +++ | φ |
| 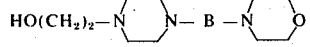 | 2 | φ | +++ | +++ | φ |
| 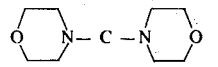 | 1 | φ | +++ | ++ bis +++ | φ |
| 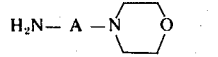 | 2 | φ | ++ | ++ | φ |
| 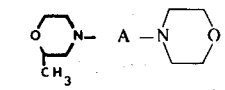 | 2 | φ | +++ | +++ | φ |
| 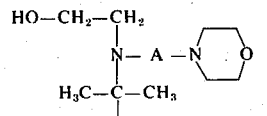 | 2 | φ | ++ | (+) | φ |
| 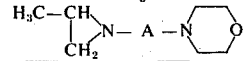 | 2 | φ | +++ | ++ | φ |
| 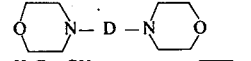 | 2 | φ | ++ | ++ | φ |
| 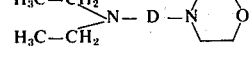 | 2 | (+)/φ | ++ | + | (–) |

Table 3 shows test values obtained on a narcotised dog after intraduodenal administration of the substances. The columns of Table 3 have the same significance as those of Table 2 and the symbols used are explained in Table 1.

Table 3

| 1 | 2 | 3 | 4 | 5 | 6 |
|---|---|---|---|---|---|
| 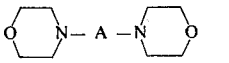 | 20 | (+) | +++ | +++ | (+) |
|  | 20 | φ | ++ | +++ | +++ |
| (C$_2$H$_5$)$_2$N— A —N(C$_2$H$_5$)$_2$ | 40 | φ | +++ | ++ | + |
| 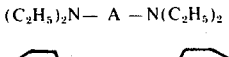 | 40 | φ (+) | +++ | + | (+) |
|  | 40 | φ | +++ | +++ | φ |
| (C$_2$H$_5$)$_2$N— A —N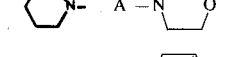 | 40 | φ | +++ | + | (+) |
| 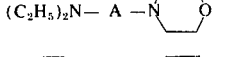 | 40 | φ | ++ | +++ | ++ |

It is apparent that compounds of the invention have a strong coronary-dilating efficiency even when administered enterally, the duration of the effect being from 1 to 3 hours.

From 4 to 10 narcotised dogs were used for each investigation. The investigations as regards circulation were carried out in accordance with standard methods further developed by the applicants and explained below.

In the investigation of circulation of a narcotised dog with a closed thorax mongrel dogs (male and female) weighing from 20 to 30 kg were narcotised, after premedication by morphine (2 mg/kg s.e.), with a mixture of ethylurea, urethane and diallyl-barbituric acid (120:120:30 mg/kg i.v.) and given artificial respiration with a narcosis apparatus of Messrs. Drager.

For measuring the coronary sinus flow, a catheter with electromagnetic flow head according to LOCHNER and OSWALD was introduced under x-ray control into the sinus coronarius.

The peripheral through flow was measured in the A. femoralis. For both flow measurements an electromagnetic flow meter of Messrs. Statham was used.

The oxygen content in the arterial and sinus blood was calibrated with the OSM 1 of Messrs. Radiometer and recorded during the duration of the experiment with the relative oxymeter of Messrs. Hellige.

The pressure in the left ventricle was recorded with a catheter according to Pieper via pressure-measuring bridges of Messrs. Hellige, the pressure in the A. abdominalis and the pressure in the right auricle were recorded with Statham elements of Messrs. Hellige via pressure-measuring bridges.

The $CO_2$ contact in the expiration air was measured with an Uras M of Messrs. Hartmann and Brown. For the application of the intraduodenal substance, the abdomen was opened and a probe introduced through the stomach into the duodenum.

The new compounds of the invention may be administered in the usual ways, in particular, orally and/or intravenously. The invention correspondingly covers pharmacological preparations or medicines which contain the active principles of the invention. Normally, they are prepared together with usual carrier substances in solid or liquid form.

In the case of oral administration, tablets or dragees are particularly suitable. The active content of such forms is, for example, between 100 and 300 mg per tablet or dragee. With solutions for injection, the content of active principle for one administration is, for example, between 50 and 150 mg.

Examples of suitable compositions of substances for some of the most important forms of administration are found at the end of the examples concerned with the preparation of the new compounds.

The following Examples illustrate the invention:

EXAMPLE 1

N-{3-[2-(4-phenylpiperazin-1-yl)ethyl]-4-methyl-2-oxo-2H-1-benzopyran-7-yl}-4-phenyl-1-piperazine carboxamide.

9.29 g (0.03 mol) of N-[3-(3-chlorethyl)-4-methyl-2-oxo-2H-1-benzopyran-7-yl]carbamethyl carbamate and 14.6 g (0.09 mol) of 1-phenylpiperazine were dissolved in 100 ml of chlorobenzene and boiled for 10 hours. After cooling, a precipitate separated out. 150 ml of a chloroform/methanol 1:1 mixture were added to the reaction product and the whole filtered while hot. The residue obtained was recrystallised twice from dimethyl formamide, washed with alcohol and dried under vacuum. 6.3 g of N-{3-[2-(4-phenylpiperazin-1-yl)ethyl]-4-methyl-2-oxo-2H-1-benzopyran-7-yl}-4-phenyl-1-piperazine carboxamide was obtained with a melting point of 285° to 288°C with decomposition.

For $C_{33}H_{37}N_5O_3$ calculated: C, 71.84%; H, 6.76%; N, 12.69%; found: C, 71.90%; H, 6.72%; N, 12.54%.

EXAMPLE 2

N-[3-(2-piperidinoethyl)-4-methyl-2-oxo-2H-1-benzopyran-7-yl]-1-piperidine carboxamide.

In a manner similar to Example 1, 9.27 g (0.03 mol) of N-[3-(2-chlorethyl)-4-methyl-2-oxo-2H-1-benzopyran-7-yl]ethyl carbamate and 8 ml of piperidine in 125 ml of chlorobenzene were boiled for 12 hours. The isolated precipitate was taken up in methanol/chloroform, filtered and the filtrate made alkaline with alcoholic potassium hydroxide solution. The solution was concentrated by evaporation and the product recrystallised from dilute alcohol.

Yield: 9 g (= 75 percent of the theoretical); melting point 256° – 260°C.

For $C_{23}H_{31}N_3O_3$ calculated: C, 69.50%; H, 7.86%; N, 10.57%; found: C, 69.64%; H, 7.96%; N, 10.57%.

EXAMPLE 3

N-[3-(3-morpholino-2-hydroxypropyl)-4-methyl-2-oxo-2H-1-benzopyran-7-yl]-4-morpholine carboxamide.

The product was prepared in a manner similar to Example 2, from 13.6 g (0.04 mol) of N-[3-(3-chloro-2-hydroxypropyl)-4-methyl-2-oxo-2H-1-benzopyran-7-yl]ethyl carbamate and 12.2 g (0.14 mol) of morpholine in 250 ml. of chlorobenzene by boiling for 18 hours.

Yield: 9.3 g (= 54 percent of the theoretical); melting point 224°–226°C (isopropanol/methylethylketone).

For $C_{22}H_{29}N_3O_6$ calculated: C, 61.26%; H, 6.76%; N, 9.75%; found: C, 61.16%; H, 6.59%; N, 9.53%.

EXAMPLE 4

N-[3-(3-piperidine-2-hydroxypropyl)-4-methyl-2-oxo-2H-1-benzopyran-7-yl]-1-piperidine carboxamide.

The product was prepared from 13.6 g (0.04 mol of N-[3-(3-chloro-2-hydroxypropyl)-4-methyl-2-oxo-2H-1-benzopyran-7-yl]ethyl carbamate and 100 ml. of piperidine by boiling for 10 hours without solvent.

Yield: 7.7 g; melting point: 204°–205°C (isopropanol)

For $C_{24}H_{33}N_3O_4$ calculated: C, 67.45%; H, 7.77%; N, 9.82%; found: C, 67.48%; H, 7.99%; N, 9.50%.

If the base is taken up in chloroform and alcoholic hydrochloric acid is added, the colourless hydrochloride, which melts above 226°C with decomposition, is formed.

EXAMPLE 5

N-{3-[3-(4-phenylpiperazin-1-yl)-2-hydroxypropyl]-4-methyl-2-oxo-2H-1-benzopyran-7-yl}-4-phenyl-1-piperazine carboxamide.

The product was obtained from 20.3 g (0.06 mol) of N-[3-(3-chloro-2-hydroxypropyl)-4-methyl-2-oxo-2H-1-benzopyran-7-yl]ethyl carbamate and 40 g (0.025 mol) of 1-phenylpiperazine in 50 ml. of chlorobenzene by boiling for 10 hours, filtering off the precipitate formed after cooling and extracting by boiling several times with isopropanol/chloroform.

Yield: 18.2 g (= 52 percent of the theoretical); melting point: 233°–235°C (isopropanol/chloroform).

For $C_{34}H_{39}N_5O_4$ calculated: C, 70.20%; H, 6.76%; N, 12.04%; found: C, 69.90%; H, 6.65%; N, 11.92%.

EXAMPLE 6

N-[3-(2-pyrrolidinoethyl)-4-methyl-2-oxo-2H-1-benzopyran-7-yl]-1-pyrrolidine carboxamide.

The product was obtained from 14.3 g (0.04 mol) of N-[3-(2-chlorethyl)-4-methyl-2-oxo-2H-1-benzopyran-7-yl] phenyl carbamate and 20 ml of pyrrolidine in 100 ml of chlorobenzene by heating for six hours at 120°C and working up by taking up the filtered-off precipitate in chloroform and washing several times with 2N-sodium carbonate solution.

Yield: 7.7 g; melting point 237°–238°C (chloroform).

For $C_{21}H_{27}N_3O_3$ calculated: C, 68.27%; H, 7.37%; N, 11.37%; found: C, 68.20%; H, 7.43%; N, 11.23%.

EXAMPLE 7

N-[3-(2-perhydroazepinoethyl)-4-methyl-2-oxo-2H-1-benzopyran-7-yl]-1-perhydroazepine carboxamide.

The product was obtained from 7.1 g (0.02 mol) of N-[3-(2-chlorethyl)-4-methyl-2-oxo-2H-1-benzopyran-7-yl] phenyl carbamate and 10 ml of perhydroazepine in 100 ml of chlorobenzene by heating for six hours at 125°C and working up according to Example 6.

Yield: 3.7 g; melting point: 225°C (dimethylformamide).

For $C_{25}H_{35}N_3O_3$ calculated: C, 70.56%; H, 8.29%; N, 9.88%; found: C, 70.86%; H, 8.19%; N, 10.01%.

EXAMPLE 8

N-[3-(2-(4-methylpiperazin-1-yl)ethyl)-4-methyl-2-oxo-2H-1-benzopyran-7-yl]-4-methyl-1-piperazine carboxamide.

The product was obtained from 14.3 g (0.04 mol) of N-[3-(2-chlorethyl)-4-methyl-2-oxo-2H-1-benzopyran-7-yl] phenyl carbamate and 20 ml of 1-methylpiperazine in 150 ml of chlorobenzene by heating for seven hours at 125°C and working up according to Example 6.

Yield: 13 g (= 75 percent of the theoretical); melting point: 261°C (dimethylformamide).

For $C_{25}H_{33}N_5O_3$ calculated: C, 64.61%; H, 7.78%; N, 16.38%; found: C, 64.42%; H, 7.64%; N, 16.29%.

EXAMPLE 9

N-[3-(2-morpholinoethyl)-4,8-dimethyl-2-oxo-2H-1-benzopyran-7-yl]-4-morpholine carboxamide.

The product was obtained from 14.9 g (0.04 mol) of N-[3-(2-chlorethyl)-4,8-dimethyl-2-oxo-2H-1-benzopyran-7-yl] phenyl carbamate and 26 g (0.3 mol) of morpholine in 80 ml of chlorobenzene by boiling for 3 hours, purifying by adsorbing the filtered-off precipitate on silica gel and then recrystallisation from ethylene chloride/ethyl acetate. Melting point: 240°–241°C.

The hydrochloride, formed by taking up the base in chloroform and adding ethereal hydrochloric acid, melts at 287°–288°C with decomposition. Yield: 8.5 g.

For $C_{22}H_{29}N_3O_5 \cdot HCl$ calculated: C, 58.50%; H, 6.69%; N, 9.30%; Cl, 7.84%; found: C, 58.44%; H, 6.46%; N, 9.33%; Cl, 8.04%.

EXAMPLE 10

N-[3-(2-piperidinoethyl)-4,8-dimethyl-2-oxo-2H-1-benzopyran-7-yl]-1-piperidine carboxamide.

The product was obtained from 10 g (0.027 mol) of N-[3-(2-chlorethyl)-4,8-dimethyl-2-oxo-2H-1benzopyran-7-yl] phenyl carbamate and 17.3 g (0.2 mol) of piperidine in 60 ml of chlorobenzene, in a similar manner to the method of Example 9.

Yield: 5.7 g (= 51 percent of the theoretical); melting point: 244°–245°C (ethylene chloride/ethyl acetate).

For $C_{24}H_{33}N_3O_3$ calculated: C, 70.06%; H, 8.08%; N, 10.21%; found: C, 69.65%; H, 7.98%; N, 10.41%.

EXAMPLE 11

N-[3-(2-perhydroazepinoethyl)-4,8-dimethyl-2-oxo-2H-1-benzopyran-7-yl]-1-perhydroazepine carboxamide.

The product was obtained from 22.3 g (0.06 mol) of N-[3-(2-chlorethyl)-4,8-dimethyl-2-oxo-2H-1-benzopyran-7-yl] phenyl carbamate and 44.6 g (0.45 mol) of perhydroazepine in 150 ml of chlorobenzene, by a method similar to that of Example 9.

Yield: 6 g; melting point: 175°–176°C (dimethylformamide/isopropyl ether).

For $C_{26}H_{37}N_3O_3$ calculated: C, 71.04%; H, 8.48%; N, 9.56%; found: C, 71.16%; H, 8.26%; N, 9.70%.

EXAMPLE 12

N-[3-(2-pyrrolidinoethyl)-4,8-dimethyl-2-oxo-2H-1-benzopyran-7-yl]-1-pyrrolidine carboxamide.

The product was obtained from 22.3 g (0.06 mol) of N-[3-(2-chlorethyl)-4,8-dimethyl-2-oxo-2H-1-benzopyran-7-yl] phenyl carbamate and 32 g (0.45 mol) of pyrrolidine in 150 ml of chlorobenzene, by boiling for 2½ hours and working up similarly to Example 9. The compound crystallises with ½ mol of ethylene chloride.

Yield: 13.5 g (= 59 percent of the theoretical); melting point: 231°–232°C (ethylene chloride/isopropyl ether For $C_{22}H_{29}N_3O_3 \cdot ½ C_2H_4Cl_2$ calculated: C, 63.81%; H, 7.22%; N, 9.71%; found: C, 63.41%; H, 7.21%; N, 9.90%.

EXAMPLE 13

N-[3-(2-(4-phenylpiperazin-1-yl)ethyl)-4,8-dimethyl-2-oxo-2H-1-benzopyran-7-yl]-4-phenyl-1-piperazine carboxamide.

The product was obtained from 3.72 g (0.01 mol) of N-[3-(2-chlorethyl)-4,8-dimethyl-2-oxo-2H-1-benzopyran-7-yl] phenyl carbamate and 12.2 g (0.075 mol) of 1-phenylpiperazine in 25 ml of chlorobenzene, by boiling for 1½ hours and recrystallising the filtered precipitate which is then washed with toluene.

Yield: 2.0 g; melting point: 246°–247°C (dimethylformamide)

For $C_{34}H_{39}N_5O_3$ calculated: C, 72.25%; H, 6.95%; N, 12.37%; found: C, 71.79%; H, 6.77%; N, 12.22%.

EXAMPLE 14

N-{3-[2-[4-(2-hydroxyethyl)piperazin-1-yl]ethyl]-4,8-dimethyl-2-oxo-2H-1-benzopyran-7-yl}-4-(2-hydroxyethyl)-1-piperazine carboxamide.

The product was obtained from 3.72 g (0.01 mol) of N-[3-(2-chlorethyl)-4,8-dimethyl-2-oxo-2H-1-benzopyran-7-yl] phenyl carbamate and 9.75 g (0.075 mol) of 1-(2-hydroxyethyl) piperazine in 25 ml of chlorobenzene by boiling for 1½ hours, taking up the lower phase which forms on cooling in chloroform and purifying on silica gel. Yield: 1.25 g; melting point: 181°–182°C (chloroform/ethyl acetate).

For $C_{26}H_{39}N_5O_5$ calculated: C, 62.25%; H, 7.84%; N, 13.96%; found: C, 61.64%; H, 7.76%; N, 13.68%.

EXAMPLE 15

1-[3-(2-diethylaminoethyl)-4-methyl-2-oxo-2H-1-benzopyran-7-yl]-3,3-diethyl urea.

The product was obtained from 32.1 g (0.09 mol) of N-[3-(2-chlorethyl)-4-methyl-2-oxo-2H-1-benzopyran-7-yl] phenyl carbamate and 60 ml of diethylamine by boiling for 16 hours in 150 ml of nitrobenzene in an autoclave, taking up the filtered off precipitate in 2N-hydrochloric acid, washing the solution with ether, making it alkaline with 2N-potassium carbonate solution, taking up the base in chloroform and purifying on silica gel. Yield: 14.5 g; melting point: 190°–191°C (isopropanol).

For $C_{21}H_{31}N_3O_3$ calculated: C, 67.53%; H, 8.37%; N, 11.25%; found: C, 67.94%; H, 8.25%; N, 11.43%.

The hydrochloride was precipitated from a chloroform solution by introduction of hydrogen chloride at 0°C. Melting point: 223°C.

For $C_{21}H_{31}N_3O_3 \cdot HCl$ Calculated: C, 61.50%; H, 7.87%; N, 10.25%; Cl, 8.65%; found: C, 61.45%; H, 7.89%; N, 10.46%; Cl, 8.59%.

EXAMPLE 16

1-{3-[2-(N-cyclohexyl-N-methylamino)ethyl]-4-methyl-2-oxo-2H-1-benzopyran-7-yl}-3-cyclohexyl-3-methyl urea.

The product was obtained from 3.6 g (0.01 mol) of N-[3-(2-chlorethyl)-4-methyl-2-oxo-2H-1-benzopyran-7-yl] phenyl carbamate and 20 ml of N-cyclohexyl-N-methylamine in 25 ml of chlorobenzene by boiling for 8 hours and purifying on silica gel.

Yield: 2.5 g (= 55 percent of the theoretical); melting point: 211°C (acetone) with decomposition.

For $C_{27}H_{39}N_3O_3$ Calculated: C, 71.49%; H, 8.67%; N, 9.26%; found: C, 71.95%; H, 8.64%; N, 9.48%.

EXAMPLE 17

1-{3-[2-(N-cyclohexyl-N-methylamino)ethyl]-4,8-dimethyl-2-oxo-2H-1-benzopyran-7-yl}-3-cyclohexyl-3-methyl urea.

The product was obtained from 22.3 g (0.06 mol) of N-[3-(2-chlorethyl)-4,8-dimethyl-2-oxo-2H-1-benzopyran-7-yl] phenyl carbamate and 51 g (0.45 mol) of N-cyclohexyl-N-methylamine in 150 ml of chlorobenzene, distilling off the excess amine and purifying the residue on silica gel.

Yield: 10 g; melting point: 152 –153°C (acetone/ethyl acetate).

For $C_{28}H_{41}N_3O_3$ calculated: C, 71.91%; H, 8.84%; N, 8.99%; found: C, 72.21%; H, 8.78%; N, 8.80%,

EXAMPLE 18

1-[3-(2-morpholinoethyl)-4-methyl-2-oxo-2H-1benzopyran-7-yl]-3,3-diethyl urea.

8.0 g (0.02 mol) of N-[3-(2-morpholinoethyl)-4-methyl-2-oxo-2H-1-benzopyran-7-yl]-4-morpholine carboxamide were dissolved in 100 ml of a mixture of chlorobenzene and nitrobenzene (1:1), 50 ml of diethylamine were added thereto and the mixture boiled for 8 hours under reflux. After concentrating the volume to half, cooling and filtering-off, the precipitate was washed with carbon tetrachloride and ether. The yield of analytically pure 1-[3-(2-morpholinoethyl)-4-methyl-2-oxo-2H-1-benzopyran-7-yl]-3,3-diethyl urea was 6.6 g (= 85% of the theoretical). Melting point: 219°–220°C.

For $C_{21}H_{29}N_3O_4$ calculated: C, 65.09%; H, 7.54%; N, 10.85%; found: C, 65.17%; H, 7.36%; N, 10.76%.

Using the method described in Example 18, the following compounds were prepared:

EXAMPLE 19

1-[3-(2-morpholinoethyl)-4-methyl-2-oxo-2H-1-benzopyran-7-yl]3-tert.butyl urea.

From 8.0 g (0.02 mol) of N-[3-(2-morpholinoethyl)-4-methyl-2-oxo-2H-1-benzopyran-7-yl]-4-morpholine carboxamide and 70 ml of tertiary butylamine.

Yield: 6.2 g (= 80 percent of the theoretical); melting point: 300°C with decomposition.

For $C_{21}H_{29}N_3O_4$ calculated: C, 65.09%; H, 7.54%; N, 10.85%; found: C, 64.95%; H, 7.47%; N, 10.94%.

EXAMPLE 20

1-[3-(2-morpholinoethyl)-4-methyl-2-oxo-2H-1-benzopyran-7-yl]-3,3-bis(2-hydroxyethyl)urea.

From 8.0 g (0.02 mol) of N-[3-(2-morpholinoethyl)-4-methyl-2-oxo-2H-1-benzopyran-7-yl]-4-morpholine carboxamide and 20 ml of bis-(2-hydroxyethyl)amine in chlorobenzene for 3 hours at 100°C. Yield: 5.45 g (= 66% of the theoretical) melting point: 187°C with decomposition.

For $C_{21}H_{29}N_3O_6$ calculated: C, 60.13%; H, 6.97%; N, 10.02%; found: C, 59.95%; H, 6.76%; N, 9.87%.

EXAMPLE 21

1-[3-(2-morpholinoethyl)-4-methyl-2-oxo-2H-1-benzopyran-7-yl]-3-phenyl urea.

From 8.0 g (0.02 mol) of N-[3-(2-morpholinoethyl)-4-methyl-2-oxo-2H-1-benzopyran-7-yl]-4-morpholine carboxamide and 50 ml of aniline in nitrobenzene for 6 hours at 130°C (bath temperature).

Yield: 6.7 g (= 83% of the theoretical); melting point: 290°C with decomposition.

For $C_{23}H_{25}N_3O_4$ calculated C, 67.79%; H, 6.18%; N, 10.31%; found: C, 67.49%; H, 6.25%; N, 10.53%.

EXAMPLE 22

N-[3-(2-morpholinoethyl)-4-methyl-2-oxo-2H-1-benzopyran-7-yl]-4-(2-hydroxymethyl)-1-piperazine carboxamide.

From 3.0 g (0.0075 mol) of N-[3-(2-morpholinoethyl)-4-methyl-2-oxo-2H-1-benzopyran-7-yl]-4-morpholine carboxamide and 30 ml of 1-(2-hydroxyethyl)-piperazine in chlorobenzene/nitrobenzene for 4 hours at 120°C (bath temperature).

Yield: 1.8 g (= 54% of the theoretical); melting point: 210°C with decomposition.

For $C_{23}H_{32}N_4O_5$ calculated: C, 62.14%, H, 7.25%; N, 12.61%; found: C, 61.88%; H, 7.21%; N, 12.71%.

EXAMPLE 23

N-[3-(2-morpholinoethyl)-4-methyl-2-oxo-2H-1-benzopyran-7-yl]-1-piperidine carboxamide.

From 8.0 g (0.02 mol) of N-[3-(2-morpholinoethyl)-4-methyl-2-oxo-2H-1-benzopyran-7-yl]-4-morpholine carboxamide and 50 ml of piperidine for 6 hours at 120°C.

Yield: 7.5 g (= 95% of the theoretical); melting point: 256°C with decomposition.

For $C_{22}H_{29}N_3O_4$ calculated: C, 66.14%; H, 7.32%; N, 10.52%; found: C, 66.18%; H, 7.18%; N, 10.73%.

EXAMPLE 24

1-[3-(2-morpholinoethyl)-4-methyl-2-oxo-2H-1-benzopyran-7-yl]-3-cyclohexyl urea.

From 8.0 g (0.02 mol) of N-[3-(2-morpholinoethyl)-4-methyl-2-oxo-2H-1-benzopyran-7-yl]-4-morpholine carboxamide and 50 ml of cyclohexylamine for 5 hours at 120°C.

Yield: 6.5 g (= 79% of the theoretical); melting point: 275°C with decomposition.

For $C_{23}H_{31}N_3O_4$ calculated: C, 66.80%; H, 7.56%; N, 10.16%; found: C, 66.47%; H, 7.62%; N, 10.04%.

EXAMPLE 25

1-[3-(2-diethylaminoethyl)-4-methyl-2-oxo-2H-1-benzopyran-7-yl]-3-phenyl urea.

From 8.0 g (0.021 mol) of 1-[3-(2-diethylaminoethyl)-4-methyl-2-oxo-2H-1-benzopyran-7-yl]-3,3-diethyl urea and 50 ml of aniline. Yield: 6.0 g (= 72% of the theoretical); melting point: 265°C with decomposition.

For $C_{23}H_{27}N_3O_3$ calculated: C, 70.20%; H, 6.92%; N, 10.68%; found: C, 70.05%; H, 6.68%; N, 10.66%.

EXAMPLE 26

N-[3-(2-morpholinoethyl)-4,8-dimethyl-2-oxo-2H-1-benzopyran-7-yl]-4-(2-hydroxyethyl)-1-piperazine carboxamide.

From 16.6 g (0.04 mol) of N-[3-(2-morpholinoethyl)-4,8-dimethyl-2-oxo-2H-1-benzopyran-7-yl]-4-morpholine carboxamide and 150 ml of 1-(2-hydroxyethyl)piperazine in 150 ml of chlorobenzene.

Yield: 6 g; melting point: 186°–187°C.

For $C_{24}H_{34}N_4O_5$ calculated: C, 62.86%; H, 7.47%; N, 12.22%; found: C, 63.39%; H, 7.29%; N, 12.26%.

EXAMPLE 27

1-[3-(2-morpholinoethyl)-4-methyl-2-oxo-2H-1-benzopyran-7-yl]-urea.

5.56 g (0.0136 mol) of N-[3-(2-morpholinoethyl)-4-methyl-2-oxo-2H-1-benzopyran-7-yl]phenyl carbamate are dissolved in 120 ml of dimethylformamide and 50 ml of cold ammoniacal ethanol are added. After stirring for 6 hours, the mixture is suction-filtered, the precipitate is washed with acetone and dried under vacuum. 2.9 g (= 65% of the theoretical) of 1-[3-(2-morpholinoethyl)-4-methyl-2-oxo-2H-1-benzopyran-7-yl]urea with a melting point higher than 300°C with decomposition, are obtained.

For $C_{17}H_{21}N_3O_4$ calculated: C, 61.62%; H, 6.39%; N, 12.68%; found: C, 61.57%; H, 6.54%; N, 12.38%.

EXAMPLE 28

N-[3-(2-morpholinoethyl)-4-methyl-2-oxo-2H-1-benzoypyran-7-yl]-2-methyl-4-morpholine carboxamide 5.56 g (0.0136 mol) of N-[3-(2-morpholinoethyl)-4-methyl-2-oxo-2H-1-benzopyran-7-yl]phenyl carbamate are dissolved in 120 ml of dimethylformamide and 20 ml of 2-methylmorpholine are added. After stirring for 6 hours, the colourless precipitate is filtered with suction and washed wish acetone. 3.15 g (= 55% of the theoretical) of N-[3-(2-morpholinoethyl)-4-methyl-2-oxo-2H-1-benzopyran-7-yl]-2-methyl-4-morpholine carboxamide with a melting point of 256°–257°C with decomposition, are obtained.

For $C_{22}H_{29}N_3O_5$ calculated: C, 63.59%; H, 7.04%; N, 10.11%; found: C, 63.84%; H, 6.73%; N, 10.12%.

The following compounds were produced in a similar manner to that of Example 28:

EXAMPLE 29

1-[3-(2-morpholinoethyl)-4-methyl-2-oxo-2H-1-benzopyran-7-yl]-3,3-diisopropyl urea.

The product was obtained from 3.0 g (0.0067 mol) of N-[3-(2-morpholinoethyl)-4-methyl-2-oxo-2H-1-benzopyran-7-yl]phenyl carbamate and 40 ml of diisopropylamine by standing for 24 hours and pouring into water. Yield: 2.3 g (= 85% of the theoretical); melting point: 215°C with decomposition.

For $C_{23}H_{33}N_3O_4$ calculated: C, 66.48%; H, 8.01%; N, 10.11%; found: C, 66.65%; H, 8.00%; N, 10.48%.

EXAMPLE 30

1-[3-(2-morpholinoethyl)-4-methyl-2-oxo-2H-1-benzopyran-7-yl]-3-tert.-butyl-3-(2-hydroxyethyl)urea.

The product was obtained from 6.5 g (0.015 mol) of N-[3-(2-morpholinoethyl)-4-methyl-2-oxo-2H-1-benzopyran-7-yl]phenyl carbamate and 15 ml of 2-tert.-butylaminoethanol.

Yield: 4.0 g (= 63% of the theoretical); melting point: 175°–176°C with decomposition.

For $C_{23}H_{33}N_3O_5$ calculated: C, 64.01%; H, 7.71%; N, 9.74%; found: C, 64.04%; H, 7.78%; N, 9.51%.

EXAMPLE 31

1-[3-(2-morpholinoethyl)-4,8-dimethyl-2-oxo-2H-1-benzopyran-7-yl]-3,3-diethyl urea.

16.6 g (0.04 mol) of N-[3-(2-morpholinoethyl)-4,8-dimethyl-2-oxo-2H-1-benzopyran-7-yl]-4-morpholine carboxamide are dissolved in 150 ml of chlorobenzene and 100 ml of diethylamine are added. After boiling for 3½ hours, the mixture is cooled, the precipitate is filtered off with suction and recrystallised from acetone. There are obtained 13.2 g (= 82% of the theoretical) of 1-[3-(2-morpholinoethyl)-4,8-dimethyl-2-oxo-2H-1-benzopyran-7-yl]-3,3-diethyl urea. Melting point: 169°–170°C.

For $C_{22}H_{31}N_3O_4$ calculated: C, 65.81%; H, 7.78%; N, 10.47%; found: C, 65.75%; H, 7.61%; N, 10.28%.

EXAMPLE 32

1-[3-(2-morpholinoethyl)-4,8-dimethyl-2-oxo-2H-1-benzopyran-7-yl]-3,3-bis(2-hydroxyethyl)urea.

16.6 g (0.04 mol) of N-[3-(2-morpholinoethyl)-4,8-dimethyl-2-oxo-2H-1-benzopyran-7-yl]-4-morpholine carboxamide are dissolved in 100 ml of chlorobenzene, 80 ml of bis-(2-hydroxyethyl)amine are added and the mixture stirred for 2 hours at 130°C. The precipitate obtained and isolated on cooling is stirred into 500 ml of water, filtered with suction, dried and purified on silica gel. There are obtained 11.4 g (= 66% of the theoretical) of 1-[3-(2-morpholinoethyl)-4,8-dimethyl-2-oxo-2H-1-benzopyran-7-yl]-3,3-bis(2-hydroxyethyl)urea with a melting point of 201°–202°C.

For $C_{22}H_{31}N_3O_6$ calculated: C, 60.95%; H, 7.21%; N, 9.69%; found: C, 60.61%; H, 7.25%; N, 9.36%.

EXAMPLE 33

N-[3-(2-morpholinoethyl)-4-methyl-2-oxo-2H-1-benzopyran-7-yl]-N-methyl-4-morpholine carboxamide 6 g (0.02 mol) of 7-methylamino-3-(2-morpholinoethyl)-4-methyl-2-oxo-2H-1-benzopyran are dissolved in 150 ml of chloroform and 0.04 mol of phosgene in 40 ml of toluene are added dropwise. After standing for 12 hours, the excess solvent and phosgene are distilled off and the resultant N[3-(2-morpholinoethyl)-4-methyl-2-oxo-2H-1-benzopyran-7-yl]-N-methyl chloroformic acid amide is heated without isolation with 120 g (1.38 mol) of morpholine for 2 hours to 40°C. After evaporating the excess morpholine, the residue is taken up in chloroform, extracted by shaking with potassium-hydrogen carbonate and the organic phase is freed from the chloroform. The oil which is obtained is crystallised by adding cyclohexane. 7.1 g (= 85.7% of the theoretical) of N-[3-(2-morpholinoethyl)-4-methyl-2-oxo-2H-1-benzopyran-7-yl]-N-methyl-4-morpholine carboxamide having the melting point of 114°–116°C are obtained.

For $C_{22}H_{29}N_3O_5$ calculated: C, 63.59%; H, 7.03%; N, 10.11%; found: C, 63.69%; H, 7.10%; N, 10.16%.

The following compounds can be prepared in a manner similar to that of Example 33:

N-[3-(2-morpholinoethyl)-4-methyl-2-oxo-2H-1-benzopyran-7-yl]-N-methyl-2-methyl-4-morpholine carboxamide; melting point: 142° to 145°C.

N-[3-(2-morpholinoethyl)-4-methyl-2-oxo-2H-1-benzopyran-7-yl]-N-methyl-1-perhydroazepine carboxamide; melting point: 98°–101°C.

1-[3-(2-morpholinoethyl)-4-methyl-2-oxo-2H-1-benzopyran-7-yl]-1-methyl-3,3-diethyl urea; melting point: 113°–115°C.

N-[3-(2-morpholinoethyl)-4-methyl-2-oxo-2H-1-benzopyran-7-yl]-N-methyl-2-methyl-1-aziridine carboxamide; melting point 105°–107°C.

1-[3-(2-morpholinoethyl)-4-methyl-2-oxo-2H-1-benzopyran-7-yl]-1,3-dimethyl-3-cyclohexyl urea;

1-[3-(2-morpholinoethyl)-4-methyl-2-oxo-2H-1-benzopyran-7-yl]-1-methyl-3,3-bis(2-hydroxyethyl) urea;

1-[3-(2-morpholinoethyl)-4-methyl-2-oxo-2H-1-benzopyran-7-yl]-1-methyl-3,3-diisopropyl urea;

1-[3-(2-morpholinoethyl)-4-methyl-2-oxo-2H-1-benzopyran-7-yl]-1-methyl-3,3-diisobutyl urea; melting point: 136°–138°C.

1-[3-(2-morpholinoethyl)-4-methyl-2-oxo-2H-1-benzopyran-7-yl]-1-methyl-3-tert.butyl urea; melting point: 133°–135°C.

N-[3-(2-morpholinoethyl)-4-methyl-2-oxo-2H-1-benzopyran-7-yl]-N-methyl-4-methyl-1-piperazine carboxamide; melting point: 116°–119°C.

N-[3-(2-morpholinoethyl)-4-methyl-2-oxo-2H-1-benzopyran-7-yl]-N-ethyl-4-methyl-1-piperidine carboxamide; melting point: 153°–156°C.

N-[3-(2-morpholinoethyl)-4-methyl-2-oxo-2H-1-benzopyran-7-yl]-N-ethyl-4-morpholine carboxamide; melting point 121°–123°C.

N-[3-(2-morpholinoethyl)-4-methyl-2-oxo-2H-1-benzopyran-7-yl]-N-ethyl-4-methyl-1-piperazine carboxamide; melting point: 160°–161°C.

1-[3-(2-morpholinoethyl)-4-methyl-2-oxo-2H-1-benzopyran-7-yl]-1-ethyl-3,3-bis(2-hydroxyethyl) urea;

1-[3-(2-morpholinoethyl)-4-methyl-2-oxo-2H-1-benzopyran-7-yl]-1-ethyl-3,3-diisopropyl urea;

1-[3-(2-morpholinoethyl)-4-methyl-2-oxo-2H-1-benzopyran-7-yl]-1-ethyl-3-cyclohexyl urea;

N-[3-(2-morpholinoethyl)-4-phenyl-2-oxo-2H-1-benzopyran-7-yl]-4-morpholine carboxamide (melting point: 244°–245°C), is formed by heating N-[3-(2-chlorethyl)-4-phenyl-2-oxo-2H-1-benzopyran-7-yl]phenyl carbamate in excess morpholine and working up as indicated above. From this compound, by the action of an excess of corresponding amines, as described, the following compounds are produced.

N-[3-(2-morpholinoethyl)-4-phenyl-2-oxo-2H-1-benzopyran-7-yl]-1-perhydroazepine carboxamide;

1-[3-(2-morpholinoethyl)-4-phenyl-2-oxo-2H-1-benzopyran-7-yl]-3-(1,1-dimethyl-2-hydroxyethyl)urea;

1-[3-(2-morpholinoethyl)-4-phenyl-2-oxo-2H-1-benzopyran-7-yl]-3,3-bis(2-hydroxypropyl)urea;

N-[3-(2-morpholinopropyl)-4-methyl-2-oxo-2H-1-benzopyran-7-yl]-4-morpholine carboxamide;

from N-[3-(2-Chloropropyl)-4-methyl-2-oxo-2H-1-benzopyran-7-yl] phenyl carbamate by reaction with morpholine.

By reacting the compound obtained above with amines, the following compounds can be prepared:

1[3-(2-morpholinopropyl)-4-methyl-2-oxo-2H-1-benzopyran-7-yl]-3,3-bis(2-hydroxyethyl)urea;

1-[3-(2-morpholinopropyl)-4-methyl-2-oxo-2H-1-benzopyran-7-yl]-3-cyclohexylurea;

N-[3-(2-morpholinopropyl)-4-methyl-2-oxo-2H-1-benzopyran-7-yl]-3-methyl-1-piperidine carboxamide;

N-[3-(2-morpholinopropyl)-4-methyl-2-oxo-2H-1-benzopyran-7-yl]-2-methyl-1-aziridine carboxamide.

N-[3-(2-morpholinobutyl)-4-methyl-2-oxo-2H-1-benzopyran-7-yl]-4-morpholine carboxamide, with the melting point 238°–239°C, from N-[3-(2-chlorbutyl)-4-methyl-2-oxo-2H-1-benzopyran-7-yl]phenyl carbamate and morpholine.

By re-amidation of the above compound, the following substances are obtainable:

N-[3-(2-morpholinobutyl)-4-methyl-2-oxo-2H-1-benzopyran-7-yl]-2-methyl-1-piperidine carboxamide;

1[3-(2-morpholinobutyl)-4-methyl-2-oxo-2H-1-benzopyran-7-yl]-3,3-diethyl urea;

1-[3-(2-morpholinobutyl)-4-methyl-2-oxo-2H-1-benzopyran-7-yl]-3-methyl-3-(2-hydroxyethyl) urea;

1-[3-(2-morpholinobutyl)-4-methyl-2-oxo-2H-1-benzopyran-7-yl]-3-cyclohexyl-3-(2-hydroxyethyl)urea;

In similar manner to the compounds described above, it is possible to prepare:

N-[3-(2-morpholinoethyl)-4,6-dimethyl-2-oxo-2H-1-benzopyran-7-yl]-4-morpholine carboxamide; melting point 192°–193°C;

N-[3-(2-morpholinoethyl)-4,6-dimethyl-2-oxo-2H-1-benzopyran-7-yl]-1-perhydroaxepine carboxamide; melting point 175°–176°C;

N-[3-(2-morpholinoethyl)-4,6-dimethyl-2-oxo-2H-1-benzopyran-7-yl]-4-methyl-1-piperazine carboxamide;

1-[3-(2-morpholinoethyl)-4,6-dimethyl-2-oxo-2H-1-benzopyran-7-yl]-3-cyclohexyl-3-(2-hydroxyethyl)urea; melting point 198°–199°C;

1-[3-(2-morpholinoethyl)-4,6-dimethyl-2-oxo-2H-1-benzopyran-7-yl]-3,3-diisobutylurea; melting point 191°–195°C;

N-[3-(2-morpholinoethyl)-6-chloro-4-methyl-2-oxo-2H-1-benzopyran-7-yl]-4-morpholine carboxamide;

1-[3-(2-morpholinoethyl)-6-chloro-4-methyl-2-oxo-2H-1-benzopyran-7-yl]-3,3-diethyl carboxamide;

1-[3-(2-morpholinoethyl)-6-chloro-4-methyl-2-oxo-2H-1-benzopyran-7-yl]-3-(4-methylcyclohexyl)urea;

1-[3-(2-morpholinoethyl)-6-chloro-4-methyl-2-oxo-2H-1-benzopyran-7-yl]-3,3-diisobutyl urea;

N-[3-(2-morpholinoethyl)-6-chloro-4-methyl-2-oxo-2H-1-benzopyran-7-yl]-3-methyl-1-piperidine carboxamide;

1-[3-(2-morpholinoethyl)-6-chloro-4-methyl-2-oxo-2H-1-benzopyran-7-yl]-3,3-bis(2-hydroxypropyl)urea;

1-[3-(2-Anilinoethyl)-4-methyl-2-oxo-2H-1-benzopyran-7-yl]3-phenylurea;

1-[3-(2-morpholinoethyl)-4-methyl-2-oxo-2H-1-benzopyran-7-yl]-3-(4-methylphenyl)urea; melting point 295°C (with decomposition);

1-[3-(2-morpholinoethyl)-4-methyl-2-oxo-2H-1-benzopyran-7-yl]-3-(4-chlorophenyl)urea; melting point 290°C (with decomposition);

1-[3-(2-morpholinoethyl)-4-methyl-2-oxo-2H-1-benzopyran-7-yl]-3-(3-trifluoromethylphenyl)urea;

N-[3-(2-morpholinoethyl)-4-methyl-2-oxo-2H-1-benzopyran-7-yl]-2-methyl-1-aziridine carboxamide; melting point 200°C (with decomposition);

1-[3-(2-morpholinoethyl)-4-methyl-2-oxo-2H-1-benzopyran-7-yl]-3-(4-hydroxyphenyl)urea;

1-[3-(2-morpholinoethyl)-4-methyl-2-oxo-2H-1-benzopyran-7-yl]-3-(4-methoxyphenyl)urea; melting point 280°C with decomposition;

1-[3-(2-morpholinoethyl)-4-methyl-2-oxo-2H-1-benzopyran-7-yl]-3,3-dicyclohexylurea; melting point 235°C.

N-[3-(2-morpholinoethyl)-2-oxo-2H-1-benzopyran-7-yl]-4-morpholine carboxamide with the melting point 232°C., and the compounds listed below, can be prepared from 7-amino-3-(2-bromethyl)-2-oxo-2H-1-benzopyran by methods similar to those described in the preceding Examples:

N-[3-(2-morpholinoethyl)-2-oxo-2H-1-benzopyran-7-yl]-2-methyl-1-piperidine carboxamide;

1-[-3-(2-morpholinoethyl)-2-oxo-2H-1-benzopyran-7-yl]-3,3-diethylurea; melting point: 193°–194°C.

1-[3-(2-morpholinoethyl)-2-oxo-2H-1-benzopyran-7-yl]-3-methyl-3-cyclohexyl urea;

N-[3-(2-morpholinoethyl)-2-oxo-2H-1-benzopyran-7-yl]-2-methyl-1-azirdine carboxamide;

1-[3-(2-morpholinoethyl)-2-oxo-2H-1-benzopyran-7-yl]-3,3-diisobutylurea;

N-[3-(2-morpholinoethyl)-2-oxo-2H-1-benzopyran-7-yl]-4-methyl-1-piperazine carboxamide;

N-[3-(2-morpholinoethyl)-2-oxo-2H-1-benzopyran-8-yl]-1-perhydroazepine carboxyamide;

1-[3-(2-diisobutylaminoethyl)-4-methyl-2-oxo-2H-1-benzopyran-7-yl]-4-morpholine carboxamide; melting point 251°C.

EXAMPLE 34

N-[3-(2-morpholinoethyl)-4-methyl-2-oxo-2H-1-benzopyran-7-yl]-4-morpholine carboxamide.

a)

N-[3-(2-chloroethyl)-4-methyl-2-oxo-2H-1-benzopyran-7-yl]phenyl carbamate.

22.9 g (0.1 mol) of N-(3-hydroxyphenyl)phenyl carbamate and 12.8 g (0.1 mol) of 2-acetyl-γ-butyrolactone are dissolved in a mixture of 160 ml of ethanol and 40 ml of dimethylformamide. Hydrochloric acid gas is introduced into the cooling solution to saturation point and the reaction mixture is then kept for 24 hours at room temperature. Thereafter, the solvent is distilled off, the residue is stirred into 600 ml of water, the crystalline precipitate is separated out, washed with water and dried. The product obtained by recrystallisation from isopropanol is dissolved in 800 ml of ethylene chloride, 12 g (0.1 mol) of thionyl chloride are added dropwise under heat and boiling takes place for 8 hours under reflux. On cooling, a crystalline precipitate is obtained, and after crystallisation from ethylene chloride, this yields 26.9 g (75% of the theoretical) of N-[3-(2-chlorethyl)-4-methyl-2-oxo-2H-1-benzopyran-7-yl]phenyl carbamate. The compound melts at 220° to 221°C.

For $C_{19}H_{16}ClNO_4$ calculated: C, 63.9%; H, 4.52%; Cl, 9.92%; N, 3.84%; found: C, 63.92%; H, 4.41%; Cl, 10.10%; N, 3.84%.

b)
N-[3-(2-morpholinoethyl)-4-methyl-2-oxo-2H-1-benzopyran-7-yl]-4-morpholine carboxamide hydrochloride 26.8 g (0.075 mol) of N-[3-(2-chlorethyl)-4-methyl-2-oxo-2H-1-benzopyran-7-yl]phenyl carbamate and 100 g (1.15 mol) of morpholine are boiled under reflux in 800 ml of chlorobenzene for 10 hours. On cooling, a crystalline precipitate is obtained, which is filtered with suction and washed with benzene. Thereafter, the precipitate is dissolved in chloroform, the solution is washed with water, and dried over sodium sulphate. Anhydrous hydrochloric acid gas is then introduced into this solution while cooling, the forming precipitate is suction-filtered and washed with chloroform. After recrystallisation from methanol/water, there are obtained 15 g (46% of the theoretical) of N-[3(2-morpholinoethyl)-4-methyl-2-oxo-2H-1-benzopyran-7-yl]-4-morpholine carboxamide hydrochloride, which melts at 291° to 294°C with decomposition.

For $C_{21}H_{27}N_3O_5 \cdot HCl$ Calculated: C, 57.65%; H, 6.45%; N, 9.60%; Cl, 8.11%; found: C, 57.85%; H, 6.34%; N, 9.71%; Cl 8.00%.

c)
N-[3-(3-(2-morpholinoethyl)-4-methyl-2-oxo-2H-1-benzopyran-7-yl]-4-morpholine carboxamide.

The hydrochloride as previously described is dissolved in water and 2N sodium hydroxide solution is added. The liberated base is extracted by shaking with chloroform, washed with water and the solution is dried. After evaporating the solvent and recrystallising from isopropanol/chloroform, N-[3-(2-morpholinoethyl)-4-methyl-2-oxo-2H-1-benzopyran-7-yl]-4-morpholine carboxamide with a melting point of 270° to 271°C (with decomposition) is obtained.

For $C_{21}H_{27}N_3O_5$ Calculated: C, 62.82%; H, 6.78%; N, 10.47%; Found: C, 63.16%; H, 6.83%; N, 10.42%.

EXAMPLE 35

N-[3-(2-morpholinoethyl)-4-methyl-2-oxo-2H-1-benzopyran-7-yl]-4-morpholine carboxamide.

a)
N-[3-(2-chlorethyl)-4-methyl-2-oxo-2H-1-benzopyran-7-yl]ethyl carbamate.

32.6 g (0.18 mol) of N-(3-hydroxyphenyl)ethyl carbamate and 23.1 g (0.18 mol) of 2-acetyl-γ-butyrolactone are dissolved in 500 ml of absolute methanol, saturated at −20° to −30°C with dry hydrochloric acid gas and kept for 24 hours at room temperature. A crystalline precipitate is formed, which is suction-filtered and suspended in 800 ml of ethylene chloride. 21.4 g (0.18 mol) of thionyl chloride are then added dropwise with heating and the solution is boiled for 1 hour. After cooling and suction filtering the formed precipitate, followed by recrystallisation from ethylene chloride, there are obtained 25 g (45% of the theoretical) of N-[3-(2-chorethyl)-4-methyl-2-oxo-2H-1-benzopyran-7-yl]-ethyl carbamate with a melting point of 227° to 228°C.

For $C_{15}H_{16}ClNO_4$ Calculated: C, 58.10%; H, 5.21%; Cl, 11.45%; N, 4.52%; Found: C, 58.29%; H, 5.19%; Cl 11.26%; N, 4.28%.

b)
N-[3-(2-morpholinoethyl)-4-methyl-2-oxo-2oxo-2H-1-benzopyran-7-yl]-4-morpholine carboxamide.

9.3 g (0.03 mol) of N-[3-(2-chlorethyl)-4-methyl-2-oxo-2H.1-benzopyran-7-yl]ethyl carbamate and 9 g (0.103 mol) of morpholine are boiled under reflux in the absence of moisture for 20 hours in 125 ml of chlorobenzene. The solvent is then evaporated, the residue dissolved in chloroform, the solution washed and dried and the organic phase concentrated by evaporation. By repeated recrystallisation of the residue from isopropanol/chloroform, there are obtained 7.8 g (65% of the theoretical) of pure N-[3-(2-morpholinoethyl)-4-methyl-2-oxo-2H-1-benzopyran-7-yl]-4-morpholine carboxamide with a melting point of 270° to 271°C. The substance is identical with that described in Example 34.

EXAMPLE 36

Specific formulations of various conventional forms ready for use are set out below.

In these examples, the compound N-[3-(2-morpholinoethyl)-4-methyl-2-oxo-2H-1-benzopyran-7-yl]-4-morpholine carboxamide hydrochloride, hereinafter referred to as "A," is used as active principle.

| Tablets | |
|---|---|
| a) | 150.0 mg of "A" |
| | 163.0 mg of lactose |
| | 110.0 mg of maize starch |
| | 13.5 mg of PVP |
| | 12.0 mg of talcum |
| | 1.5 mg of magnesium stearate |
| | 450.0 mg |

All substances are mixed. The mixture is initially pressed into briquette form. These briquettes are crushed the granulated material is comminuted to a uniform grain size of about 1 mm and compressed to form tablets with a weight of 450 mg and a diameter of 11 mm.

| Dragees | |
|---|---|
| b) | 150.0 mg of "A" |
| | 100.0 mg of lactose |
| | 50.0 mg of maize starch |
| | 10.0 mg of PVP |
| | 9.0 mg of talcum |
| | 1.0 mg of magnesium stearate |
| | 320.0 mg |

Preparation of a granulated material as under a). Compression into dragee cores with a weight of 520 mg and a diameter of 10 mm.

The cores can be coated in known manner with sugar solutions or lacquered with lacquer solutions.

| c) Suppositories | 300 mg of "A" |
|---|---|
| | 1700 mg of hard fat DAB 7 |
| | 2000 mg |

The extremely finely ground "A" is the well suspended in the molten base at a temperature not above 45°C and homogenised. The homogeneous mass is poured into moulds.

d) For using the compounds according to the invention in a form which can be injected, the injection solution is preferably prepared immediately before use. For this purpose, it is advantageous to use a dry ampoule, in which the active principle or — because of the better solubility in water — the mixture of the active principle with a physiologically acceptable acid or the salt of the active principle with an acid is contained.

Substances which have proved particularly suitable are the mono salts of polybasic acids, such as tartaric acid, citric acid, adipic acid; obviously also monobasic acids, such as lactic acid, can also be used.

As a single dose of the active material, amounts between 25 and 100 mg are to be considered. The active material is dissolved immediately before the injection in 2 ml of water per injection.

d.1) Example for the preparation of a dry ampoule with a mixture of N-[3-(2-morpholinoethyl)-4-methyl-4-oxo-2H-1-benzopyran-7-yl]-4-morpholine carboxamide (hereinafter designated as "B") and tartaric acid:

500 g of "B" are intimately mixed with 186.8 g of tartaric acid. 69 mg of this mixture are introduced under aseptic conditions into ampoules having a normal capacity of 5 ml, so that the indicated quantity is sufficient for filling 10,000 ampoules.

d2) Example of the preparation of a dry ampoule of a salt of "B" and tartaric acid:

500 g of "B" are heated in 5 litres of chloroform and 1 litre of methanol is added. A solution of 186 g of tartaric acid in 1 litre of methanol is then also added. The forming solution is concentrated by evaporation under vacuum to 5 litres. Each 0.5 ml of this solution is introduced with a suitable device into ampoules and subjected to freeze-drying, the salt forming in amorphous form, which contains per ampoule 50 mg of "B" as hydrogen tartrate. Thereafter, the ampoules are sealed. The quantities used are sufficient for the preparations of 10,000 dry ampoules.

What is claimed is:

1. A coronary dilator composition comprising, as an active ingredient, an effective amount of a compound of the formula $$R_6 - N(R_5) - C(=O) - N(R_4) - \text{[benzopyran with }(Z)_n\text{]} - U - N(R_1)(R_2) \quad (I)$$

wherein $R_1$, $R_2$, $R_5$, and $R_6$ are hydrogen, or straight-chain or branched-chain alkyl or hydroxyalkyl of up to 4 carbon atoms, cyclohexyl, phenyl or phenyl substituted with one of halogen, hydroxy, lower alkyl or alkoxy of 1 to 3 carbon atoms, or trifluoromethyl; at least one of the radical pairs $R_1$ and $R_2$, and $R_5$ and $R_6$, when taken together with the adjacent nitrogen atom represent morpholino or methylmorpholino; $R_4$ is hydrogen, lower alkyl of up to 3 carbon atoms, $R_7$ is hydrogen, lower alkyl of up to 3 carbon atoms, or phenyl; Z is halogen or lower alkyl of up to 3 carbon atoms; $n$ represents a number from 0 to 2, and U is straight-chain or branched-chain lower alkylene, or monohydroxy-alkylene of from 2 to 5 carbon atoms; and the pharmacologically acceptable salts thereof in admixture with a pharmaceutically acceptable carrier.

2. The composition of claim 1 wherein said active ingredient compound is a symmetrical morpholino compound.

3. The composition of claim 1 wherein said compound in N-[3-(2-morpholinoethyl-4-methyl-2-oxo-2H-1-benzopyran-7-yl]-4-morpholine carboxamide.

4. The composition of claim 1 wherein said compound is N-[3-(3-morpholino-2-hydroxypropyl)-4-methyl-2-oxo-sH-1-benzopyran-7-yl]-4-morpholine carboxamide.

5. The composition of claim 1 wherein said compound is N-[3-(2-morpholinoethyl)- 4-methyl2-oxo-2H. 1-benzopyran-7-yl]-1-piperidine carboxamide.

6. The composition of claim 1 wherein said compound is 1-[3-(2-morpholinoethyl)- 4-methyl-2-oxo-2H-1-benzopyran-7-yl]-3,3-diethyl urea.

7. The composition of claim 1 wherein said compound is N-[3-(2-morpholinoethyl)-4-methyl-2-oxo-2H-1-benzopyran-7-yl]-2-methyl-4-morpholine carboxamide.

8. A method of increasing the coronary blood-flow in a patient in need thereof which comprises administering to said patient an effective amount of a compound as defined in claim 1.

9. The method of claim 8 wherein, in the formula of said compound, at least one of $R_1, R_2$, $R_5$ and $R_6$ is hydroxyalkyl.

10. The method of claim 8 in which at least one of $R_1$, $R_2$, $R_5$ and $R_6$ is phenyl.

11. The method of claim 8 in which at least one of $R_1$, $R_2$, $R_5$ and $R_6$ is phenyl substituted with one of halogen, hydroxy, lower alkyl, or alkoxy of 1 to 3 carbon atoms or trifluoromethyl.

12. The method of claim 8 in which at least one of $R_1$, $R_2$, $R_5$ and $R_6$ is hydrogen.

13. The method of claim 8 in which at least one of $R_1$, $R_2$, $R_5$ and $R_6$ is alkyl of up to 4 carbon atoms.

14. The method of claim 8 wherein $R_1$ is alkyl of from 1 to 2 carbon atoms, $R_2$ is alkyl of from 1 to 2 carbon atoms or phenyl, $R_3$ is hydrogen or methyl, and $R_4$ is hydrogen or methyl.

15. The method of claim 8 wherein Z is lower alkyl of up to 3 carbon atoms.

16. The method of claim 8 wherein U is monohydroxyalkylene of from 2 to 5 carbon atoms.

17. The method of claim 8 wherein said compound is N-[3-(2-morpholinoethyl)-4-methyl-2-oxo-2H-1-benzopyran-7-yl]-4-morpholine carboxamide.

18. The method of claim 8 wherein said compound is N-[3-(3-morpholino-2-hydroxypropyl)-4-methyl-2oxo-2H-1-benzopyran-7-yl]-4-morpholine carboxamide.

19. The method of claims 8 wherein said compound is N-[3-(2-morpholinoethyl)-4-methyl-2-oxo-2H-1-benzopyran-7yl]-1-piperidine carboxamide.

20. The method of claim 8 wherein said compound is 1-[3-(2-morpholinoethyl)-4-methyl-2-oxo-2H-1-benzopyran-7yl]-3,3-diethyl urea.

21. The method of claim 8 wherein said compound is N-[3-2-morpholinoethyl)-4-methyl-2-oxo-2H-1-benzopyran-7-yl]-2-methyl-4-morpholine carboxamide.

* * * * *